(12) United States Patent
Lindblade et al.

(10) Patent No.: US 12,391,339 B2
(45) Date of Patent: Aug. 19, 2025

(54) CONNECTOR ASSEMBLIES

(71) Applicant: SOFEC, INC., Houston, TX (US)

(72) Inventors: Stephen P. Lindblade, Waller, TX (US); Saradhi Koneru, Houston, TX (US); Hao Yu, Katy, TX (US)

(73) Assignee: SOFEC, INC., Houston, TX (US)

( * ) Notice: Subject to any disclaimer, the term of this patent is extended or adjusted under 35 U.S.C. 154(b) by 503 days.

(21) Appl. No.: 17/966,184

(22) Filed: Oct. 14, 2022

(65) Prior Publication Data

US 2023/0124086 A1 Apr. 20, 2023

Related U.S. Application Data

(60) Provisional application No. 63/255,749, filed on Oct. 14, 2021.

(51) Int. Cl.
*B63B 21/00* (2006.01)
*B63B 21/50* (2006.01)
*F16B 7/04* (2006.01)
*F16B 21/18* (2006.01)

(52) U.S. Cl.
CPC .............. *B63B 21/00* (2013.01); *F16B 7/042* (2013.01); *F16B 21/18* (2013.01); *B63B 2021/001* (2013.01); *B63B 2021/004* (2013.01); *B63B 21/50* (2013.01); *B63B 2021/501* (2013.01)

(58) Field of Classification Search
CPC ... B63B 21/00; B63B 21/50; B63B 2021/001; B63B 2021/002; B63B 2021/003; B63B 2021/004; B63B 2021/501; F16B 7/0413; F16B 7/042; F16B 21/18; F16B 21/183; F16B 21/186; Y10S 403/07;
(Continued)

(56) References Cited

U.S. PATENT DOCUMENTS 3,321,217 A * 5/1967 Ahlstone ............... E21B 33/038
                                                                285/379
4,057,267 A * 11/1977 Jansen, Jr. ............ E21B 17/043
                                                                285/308
(Continued)

FOREIGN PATENT DOCUMENTS

DE         1075898 B  *  2/1960  .............. F16B 21/18
EP      0202990 A1  * 11/1986  ............. F16B 21/183

*Primary Examiner* — Josh Skroupa
(74) *Attorney, Agent, or Firm* — Edmonds & Cmaidalka, P.C.

(57) ABSTRACT

A connector assembly can include a stinger and a sleeve assembly that includes a latching mechanism. An outer surface of the stinger can define first and second grooves located toward first and second ends, respectively, thereof. An inner surface of the sleeve assembly can define first and second shoulders located toward first and second ends, respectively, thereof. The latching mechanism can be in an unlocked position or a locked position. When the latching mechanism is unlocked the stinger can be inserted into or removed from the sleeve assembly. When the stinger is within the sleeve assembly and the latching mechanism is locked, the latching mechanism can maintain a first split ring partially within the first groove and partially on the first shoulder and a second split ring partially within the second groove and partially on the second shoulder to secure the stinger within the sleeve assembly.

20 Claims, 7 Drawing Sheets

(58) Field of Classification Search
CPC .......... Y10T 403/591; Y10T 403/593; Y10T 403/7052; Y10T 403/7066; Y10T 403/7069
USPC .......... 403/322.1, 322.3, 368, 374.2, 374.4, 403/DIG. 7
See application file for complete search history.

(56) References Cited

U.S. PATENT DOCUMENTS

| | | | | |
|---|---|---|---|---|
| 4,182,579 | A * | 1/1980 | McCormick | F16B 21/18 411/517 |
| 4,526,406 | A * | 7/1985 | Nelson | F16L 37/002 285/920 |
| 9,482,068 | B2 * | 11/2016 | Lyle | E21B 19/002 |
| 2017/0297655 | A1 * | 10/2017 | Pearlman | F16B 7/0413 |

* cited by examiner

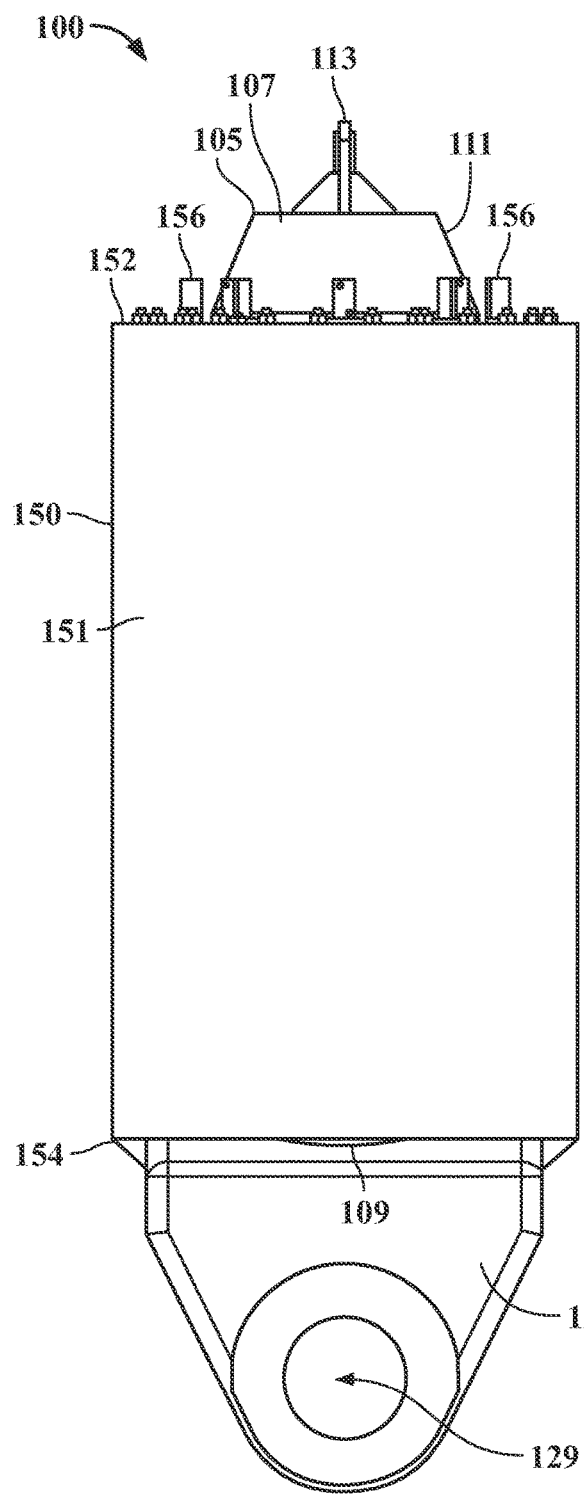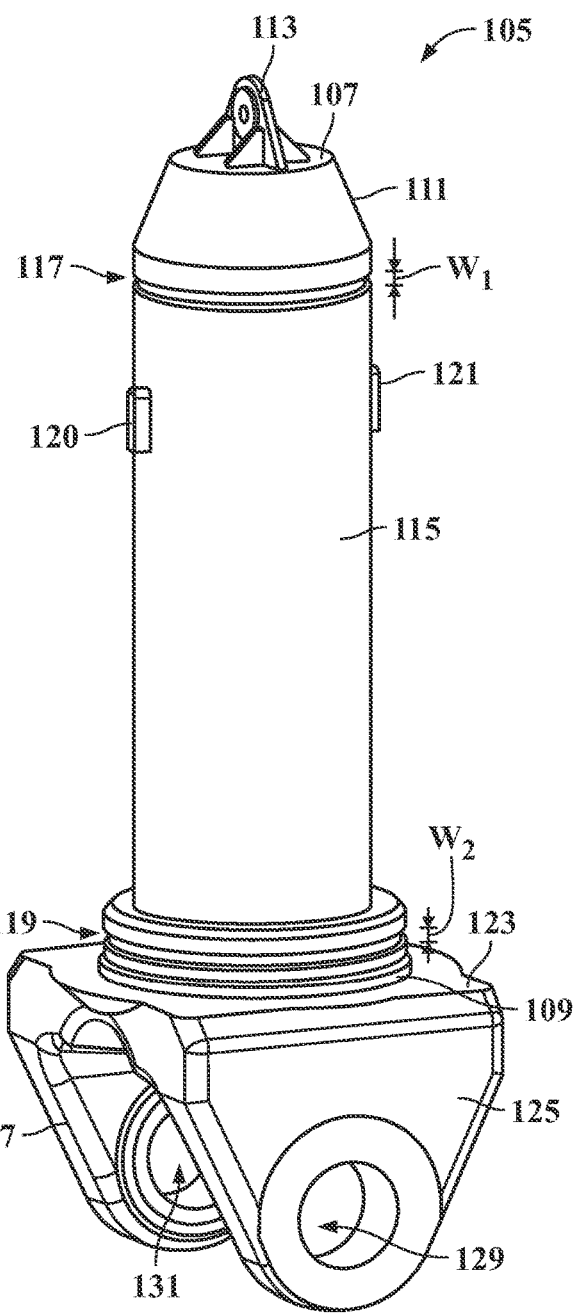
FIG. 1   FIG. 2

CONNECTOR ASSEMBLIES

CROSS-REFERENCE TO RELATED APPLICATION

This application claims priority to U.S. Provisional Patent Application No. 63/255,749, filed on Oct. 14, 2021, which is incorporated by reference herein.

FIELD

Embodiments described generally relate to connector assemblies. More particularly, such embodiments relate to connector assemblies that can be used to moor floating vessels that can be disconnected in the event of oncoming severe weather and reconnected thereafter.

BACKGROUND

In the drilling, production, and transportation of offshore oil and gas, mooring systems have been used to connect floating production, storage, and offloading (FPSO) vessels, floating storage and offloading (FSO) vessels, barges, tankers, and other floating vessels to mooring structures. Some conventional mooring systems are permanent, meaning the connected vessel can be maintained on location even in 100-year survival environmental conditions. Other conventional mooring systems are disconnectable, allowing vessels to leave the field to avoid severe weather events and conditions such as harsh seas, typhoons, hurricanes, and icebergs.

The process for connecting and disconnecting a vessel to the mooring structure via the conventional mooring systems can be time consuming and require complex systems and external intervention even in very limited sea states. These significant connect and disconnect sequence times can result in undesirable lost production time, injury, or worse.

There is a need, therefore, for improved connector assemblies for use in connecting two bodies together, e.g., for use in mooring a vessel to a mooring structure at sea.

SUMMARY

Connector assemblies are provided. In some embodiments, the connector assembly can include a stinger and a sleeve assembly. The stinger can include a first end and a second end. An outer surface of the stinger can define a first groove located toward the first end thereof and a second groove located toward the second end thereof. The sleeve assembly can include a first end, a second end, and a latching mechanism. The sleeve assembly can be configured to receive the stinger and secure the stinger therein via the latching mechanism. An inner surface of the sleeve assembly can define a first shoulder located toward the first end thereof and a second shoulder located toward the second end thereof. The latching mechanism can be selectively moveable between an unlocked position and a locked position. When the latching mechanism is in the unlocked position the stinger can be inserted into or removed from the sleeve assembly. When the stinger is fully positioned within the sleeve assembly and the latching mechanism is in the locked position the latching mechanism can be configured to maintain a first split ring in a position partially within the first groove and partially on the first shoulder and a second split ring in a position partially within the second groove and partially on the second shoulder to secure the stinger within the sleeve assembly In some embodiments, the connector assembly can include a stinger and a sleeve assembly. The stinger can include a first end and a second end. An outer surface of the stinger can define a first groove located toward the first end thereof and a second groove located toward the second end thereof. The sleeve assembly can be configured to receive and secure the stinger therein. The sleeve assembly can include a first end, a second end, a first stationary inner wall disposed toward the first end thereof, a second stationary inner wall disposed toward the second end thereof, and a moveable inner wall disposed between the first and second stationary inner walls that can be configured to move with respect to the first and second stationary inner walls. The first stationary inner wall can define a first shoulder. The second stationary inner wall can define a second shoulder. A first split ring can be disposed on the first shoulder. A second split ring can be disposed on the second shoulder. A first actuator ring can be disposed above the first split ring that can be configured to force the first split ring partially into the first groove and partially on the first shoulder when the first actuator ring is moved from a first position to a second position. A second actuator ring can be disposed on an end of the moveable inner wall that can be proximate the second stationary inner wall. The second actuator ring can be configured to force the second split ring partially into the second groove and partially on the second shoulder when the moveable inner wall is moved from a first position to a second position.

BRIEF DESCRIPTION OF THE DRAWINGS

The subject disclosure is further described in the detailed description that follows in reference to the drawings by way of non-limiting embodiments, in which like reference numerals represent similar parts throughout the embodiments shown in the drawings.

FIG. 1 depicts a side elevation view of an illustrative connector assembly in an engaged and secured or locked configuration that includes a stinger and a sleeve assembly, according to one or more embodiments described.

FIG. 2 depicts a perspective view of the stinger partially shown in FIG. 1, according to one or more embodiments described.

DETAILED DESCRIPTION

Figure 3:
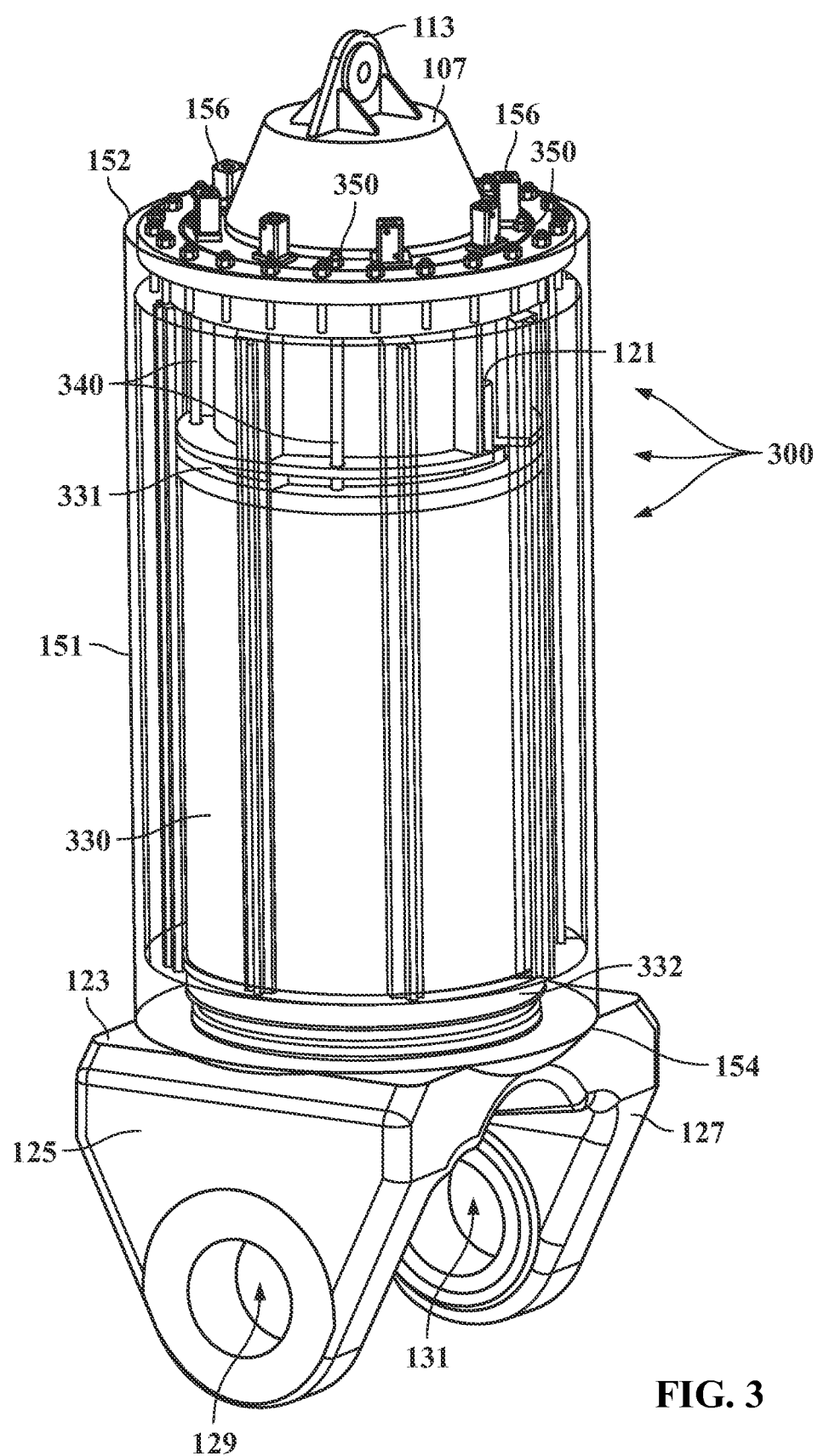
FIG. 3 depicts a perspective cut away view of the connector assembly shown in FIG. 1 that further shows some components of a latching mechanism of the sleeve assembly disposed about the stinger, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the connector assembly and processes for using same may be equally effective at various angles or orientations.

Figure 4:
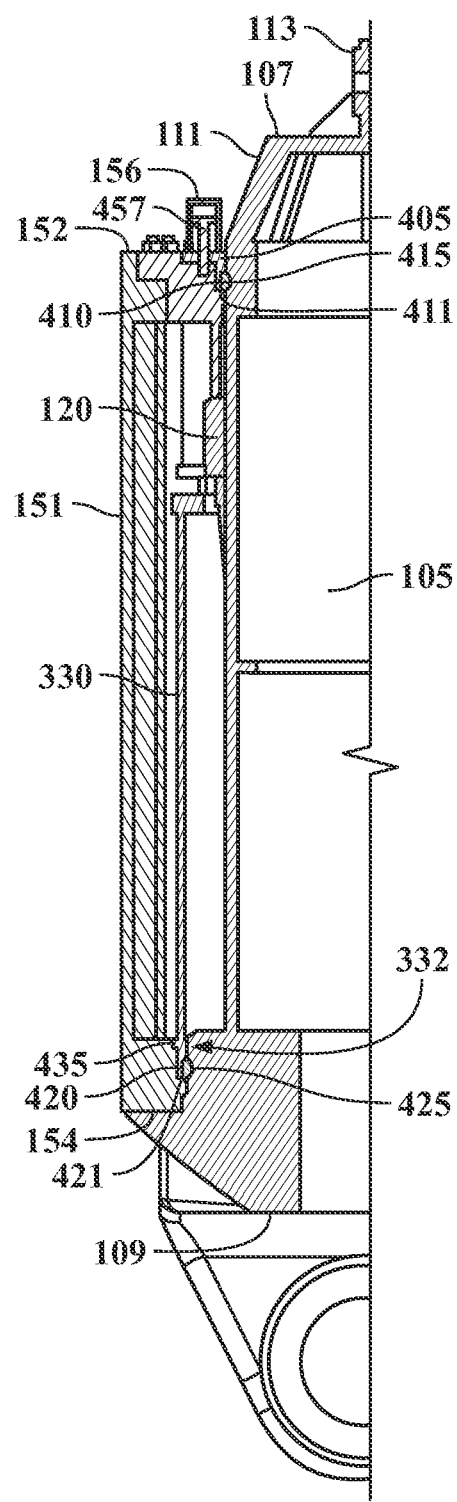
FIG. 4 depicts a partial cross-sectional elevation view of the connector assembly shown in FIG. 1 that shows additional components of a latching mechanism of the sleeve assembly, according to one or more embodiments described.
Figure 5:
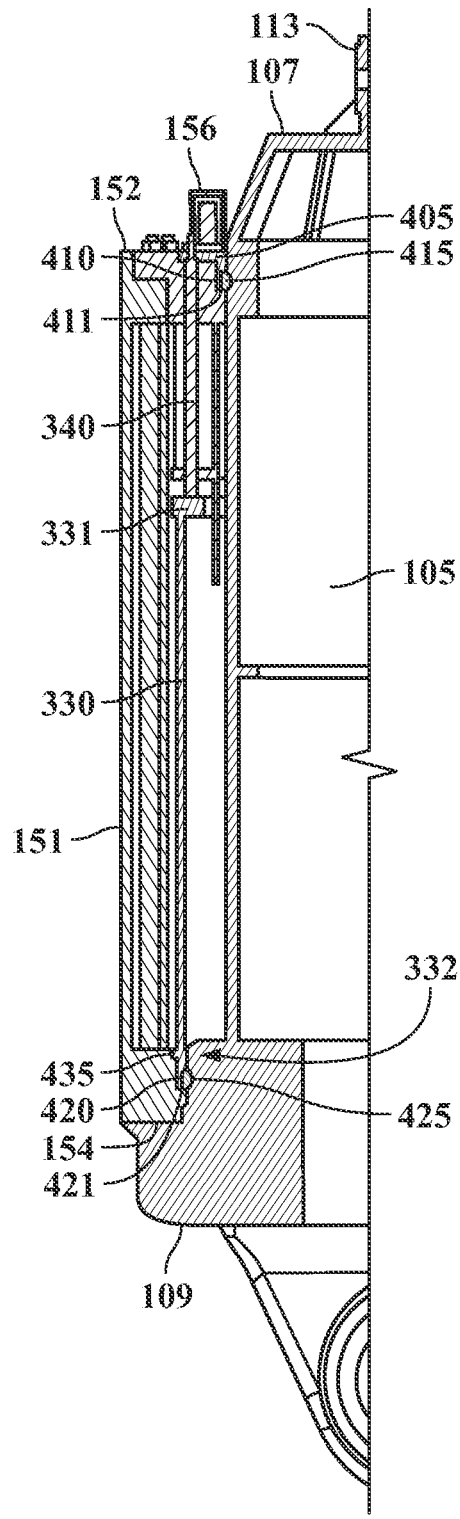
FIG. 5 depicts another partial cross-sectional elevation view of the connector assembly shown in FIG. 1 that shows additional components of a latching mechanism of the sleeve assembly, according to one or more embodiments described.
Figure 6:
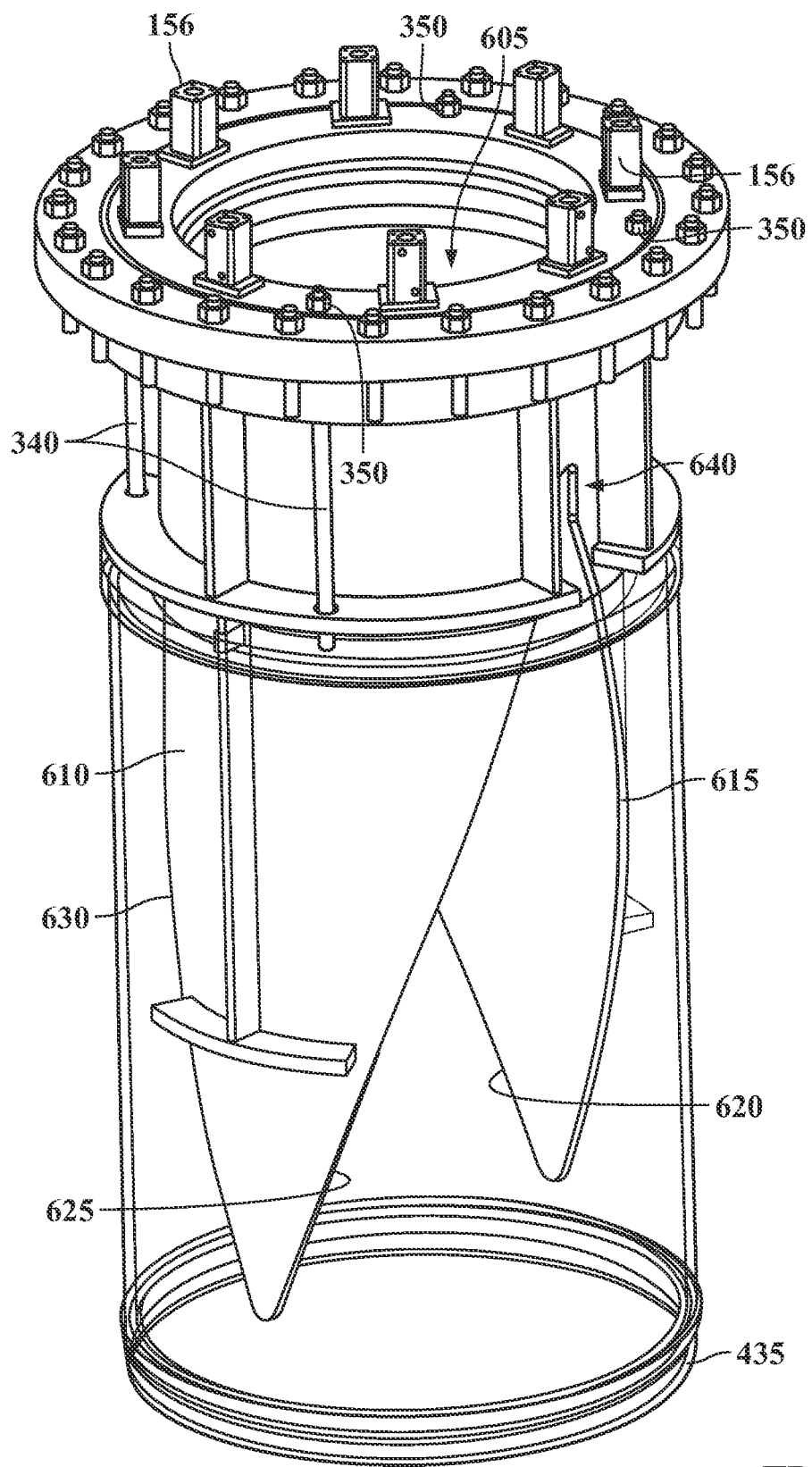
FIG. 6 depicts a perspective cut away view of an illustrative inner guide that includes at least one guide surface at least partially disposed within a moveable inner wall of the latching mechanism shown in FIGS. 3-5, according to one or more embodiments described.

FIG. 1 depicts a side elevation view of an illustrative connector assembly 100 in an engaged and secured or locked configuration that includes a stinger 105 and a sleeve assembly 150, according to one or more embodiments. FIG. 2 depicts a perspective view of the stinger 105 partially shown in FIG. 1, according to one or more embodiments. FIG. 3 depicts a perspective cut away view of the connector assembly 100 shown in FIG. 1 that shows some components of a latching mechanism 300 of the sleeve assembly 150 disposed about the stinger 105, according to one or more embodiments. FIGS. 4 and 5 each depict a partial cross-sectional elevation view of the connector assembly shown in FIG. 1 that show additional components of the latching mechanism 300 of the sleeve assembly 150, according to one or more embodiments. FIG. 6 depicts a perspective cut away view of an illustrative inner guide 610 that includes at least one guide surface (four are shown, 615, 620, 625, 630) that can be at least partially disposed within a moveable inner wall 330 of the latching mechanism 300 shown in FIGS. 3-5, according to one or more embodiments.

As described in more detail below, the latching mechanism 300 can be selectively moveable between a first or unlocked position and a second or locked position. When the latching mechanism 300 is in the first or unlocked position, the stinger 105 can be fully inserted into or removed from the sleeve assembly 150. When the stinger 105 is fully inserted into the sleeve assembly 150, the latching mechanism can be moved from the first or unlocked position to the second or locked position to secure the stinger 105 within the sleeve assembly 150.

Continuing with reference to FIGS. 1-6, the stinger 105 can have a first end 107 and a second end 109 and the sleeve assembly 150 can have a first end 152 and a second end 154. The sleeve assembly 150 can be configured to receive the stinger 105 such that the first end 107 of the stinger 105 can be inserted into the second end 154 of the sleeve assembly 150 and pass into an inner bore 605 (see FIG. 6) defined by the sleeve assembly 150 such that the first end 107 of the stinger 105 and/or an optional connector structure 113, e.g., a padeye, a clevis, a trunnion, or the like, disposed on the first end 107 of the stinger 105 at least partially extends out of the first end 152 of the sleeve assembly 150. In some embodiments, the first end 107 of the stinger 105 can have a frustoconical surface 111. In other embodiments, the first end 107 of the stinger 105 can have a frusto-pyramidal surface. The frustoconical surface 111 or frusto-pyramidal surface at the first end 107 of the stinger 105 can help guide or otherwise facilitate initial insertion of the stinger 105 into the second end 154 of the sleeve assembly 150.

In some embodiments, the stinger 105 can have a generally cylindrical outer surface 115. The stinger 105 can define a first groove 117 and a second groove 119 about the at least a portion of an outer surface 115 thereof. In some embodiments, the first groove 117 and/or the second groove 119 can be circumferential grooves that can be disposed about the outer surface 115 of the stinger 105. In some embodiments, the first groove 117 can be located toward the first end 107 of the stinger 105 and the second groove 119 can be located toward the second end 109 of the stinger 105. It should be understood that the first and second grooves 117, 119 can be located at any desired position between the first end 107 and the second end 109 of the stinger 105. As shown in FIGS. 2, 4, and 5, in some embodiments, an outer diameter of the first groove 117 can be less than an outer diameter of the second groove 119. Said another way, the outer diameter of the stinger 105 where the second groove 119 is defined toward the second end 109 thereof can be greater than the outer diameter of the stinger 105 where the first groove 117 is defined toward the first end 107 thereof. In some embodiments, the stinger 105 can have a solid body such that the stinger 105 does not include any bore, channel, or other flow path that extends from the first end 107 to the second end 109.

In some embodiments, an optional connector structure 123, e.g., a padeye, a clevis, a trunnion, a lug, or other structure, can be disposed on the second end 109 of the stinger 105. As shown in FIGS. 2 and 3, the connector structure 123 can be a clevis that can include a pair of arms 125, 127 that define axially aligned bores 129, 131, respectively, therethrough. In other embodiments, a lug (not shown) that defines a bore therethrough can be disposed on the second end 109 of the stinger 105. In still other embodiments, a trunnion can be disposed on the second end 109 of the stinger 105. The connector structure 123 disposed on the second end 109 of the stinger 105 can be connected to a cooperating or corresponding connector structure such that a mechanical connection between the stinger 105 and an additional structural member can be formed. For example, when the connector structure 123 is a clevis, a lug that defines a bore therethrough can be disposed between the pair of arms 125, 127 and a pin can be inserted through the bores 129, 131 and the bore defined by the lug to pivotably secure the two structures to one another. In another example, if the connector structure 123 is the lug, the lug can be configured to be disposed between a pair of arms of a clevis that define axially aligned bores therethrough and secured thereto via insertion of a pin through the bores. In other embodiments, the second end 109 of the stinger 105 can be secured, e.g., via a weld, bolt, threaded outer surface, or any other fastening apparatus, such that the second end 109 of the stinger 105 can be rigidly connected to a corresponding structure (not shown).

The sleeve assembly 150 can include an outer housing 151. In some embodiments, the outer housing 151 can have a substantially cylindrical outer surface that can have a bore therethrough within which components of the sleeve assembly 150 can be at least partially disposed. In other embodiments, however, the outer housing 151 of the sleeve assembly 150 can have any desired geometrical cross-sectional shape or combination of cross-sectional shapes. For example, the outer housing 151 of the sleeve assembly 150 can have a cross-sectional shape that can be triangular, rectangular, circular, pentagonal, hexagonal, or the like, or any combination thereof. The cross-sectional shape(s) of the outer surface of the outer housing 151 can be configured as desired for a given application. The outer housing 151 can be configured to be secured to a structure, e.g., a floating vessel, to which the stinger 105 and an additional structural member, e.g., a link arm or extension arm, coupled to the connector structure 123 thereof can be coupled together when the stinger 105 has been inserted into and secured within the sleeve assembly 150. Connection systems or processes suitable for securing the outer housing 151 of the sleeve assembly to a desired structure can include, but are not limited to, welding, bolts, bolts and nuts, rivets, pins, screws, mechanical connectors such as a collet connector, adhesives, or the like.

In some embodiments, the latching mechanism 300 can include, but is not limited to, one or more actuators 156, a first actuator ring 405, a first stationary inner wall 410 disposed toward the first end 152 of the sleeve assembly 150, a first split ring 415, a second stationary inner wall 420 disposed toward the second end 154 of the sleeve assembly 150, a second split ring 425, a moveable inner wall 330 having a first end 331 and a second end 332, a second actuator ring 435, and one or more guide rods or connecting members 340. The first split ring 415 can be disposed on a first shoulder 411 defined by the first stationary inner wall 410. The second split ring 425 can be disposed on a second shoulder 421 defined by the second stationary inner wall 420. In some embodiments, the first shoulder 411 and/or the second shoulder 421 can be circumferential shoulders in that the first shoulder 411 and/or the second shoulder 421 can extend about an inner circumference or perimeter of first stationary inner wall 410 and the second stationary inner wall 420, respectively. The moveable inner wall 330 can be disposed between the first and second stationary inner walls 410, 420. The second actuator ring 435 can be disposed about at least a portion of a perimeter of the second end 332 of the moveable inner wall 330. In some embodiments, the one or more connecting members 340 can be coupled to the first actuator ring 405 and the first end 331 of the moveable inner wall 330. In such embodiments, the moveable inner wall 330 along with the second actuator ring 435 can simultaneously move with the first actuator ring 405, e.g., via actuation of the one or more actuators 156.

The latching mechanism 300 can be operated to move between a first or an unlocked position and a second or locked position by actuating the one or more actuators 156. The actuators 156 can be or can include, but are not limited to, hydraulic actuators, pneumatic actuators, electric actuators, or a combination thereof. In some embodiments, the actuators 156 can be moved from the first or unlocked position to the second or locked position by moving a piston 457 (see FIGS. 4, 7, and 9) in a manner that moves the first actuator ring 405 between the first stationary inner wall 410 and an outer diameter of the first split ring 415 with sufficient force to cause the first split ring 415 to move partially into the first groove 117 defined by the outer surface 115 of the stinger 105. The actuators 156 can also cause the moveable inner wall 430 and, as such, the second actuator ring 435 to move between the second stationary inner wall 420 and an outer diameter of the second split ring 425 with sufficient force to cause the second split ring 425 to move partially into the second groove 119 defined by the outer surface 115 of the stinger 105. Once the first and second split rings 415, 425 are partially within the first and second grooves 117, 119, respectively, the stinger 105 is rigidly connected to the sleeve assembly 150. To disengage or disconnect the stinger 105 from the sleeve assembly 150 the actuators 156 can be moved in a reverse manner as when moved to the second or locked position to allow the stinger 105 to be removed therefrom.

As noted above, in some embodiments, the outer diameter of the first groove 117 can be less than the outer diameter of the second groove 119. In such embodiments, an outer diameter of the second split ring 425 can be greater than an outer diameter of the first split ring 415. In other embodiments, the outer diameter of the first groove 117 and the outer diameter of the second groove 119 can be the same such that the outer diameter of the first and second split rings 415, 425 can be the same. In still other embodiments, the outer diameter of the first groove 117 can be greater than the outer diameter of the second groove 119 such that the outer diameter of the first split ring 415 can be greater than the outer diameter of the second split ring 425.

In some embodiments, the second split ring 425 can be configured to support a greater axial load than the first split ring 415 when the stinger 105 is fully positioned within the sleeve assembly 150 and the latching mechanism 300 is in the second or locked position. In some embodiments, the first split ring 415 can be configured to support a greater radial load than the second split ring 425 when the stinger 105 is fully positioned within the sleeve assembly 150 and the latching mechanism 300 is in the second or locked position. In some embodiments, the second split ring 425 can be configured to support a greater total load than the first split ring 415 when the stinger 105 is fully positioned within the sleeve assembly 150 and the latching mechanism 300 is in the second or locked position.

In some embodiments, the stinger 105 can include one or more alignment keys (two are shown, 120, 121) disposed on the outer surface 115 thereof. In some embodiments, the stinger 105 can include one, two, three, four, or more alignment keys disposed on the outer surface 115 thereof. The alignment keys 120, 121 can each engage one of the guide surfaces 615, 620, 625, 630 during insertion of the stinger 105 into the sleeve assembly 150 to rotatively align the stinger 105 within the sleeve assembly 150. For example, in some embodiments, alignment key 120 can engage guide surface 630 and alignment key 121 can engage guide surface 615 to rotatively algin the stinger 105 within the sleeve assembly 150 in a counterclockwise direction. In another example, alignment key 120 can engage guide surface 620 and alignment key 121 can engage guide surface 625 to rotatively align the stinger 105 within the sleeve assembly 150 in a clockwise direction. In some embodiments, the alignment keys 120, 121, if present, can be located anywhere on the outer surface 115 of the stinger 105 between the first and second grooves 117, 119.

In some embodiments, the alignment keys 120, 121 can generally be cuboid in shape and a longitudinal axis of the alignment keys 120, 121 can be substantially parallel to a central longitudinal axis of the stinger 105. In some embodiments, the ends of the alignment keys 120, 121 can have a rounded, chamfered, or other non-flat end located on an end thereof that faces the first end 107 of the stinger 105 that can facilitate engagement and movement of the alignment keys 120, 121 into respective alignment slots (one is shown, 640) of the inner guide 610 into which the inner guide surfaces 615, 620, 625, 630 can guide or otherwise direct the alignment keys 120, 121 disposed on the stinger 105 during insertion of the stinger 105 into the sleeve assembly. The terminal end of the alignment slots (one is shown, 640) can serve as a stop for the stinger 105. When the alignment keys 120, 121 enter into their respective alignment slots (one is shown, 640) the singer 105 is fully positioned within the sleeve assembly 150 and the latching mechanism 300 can be moved from the first or unlocked position to the second or locked position to secure the stinger 105 therein.

In some embodiments, the sleeve assembly 150 can also include one or more auxiliary locking apparatus 350 (see FIGS. 3 and 6). The auxiliary locking apparatus 350 can be a mechanical fastener, a mechanical latch, or a combination thereof. In some embodiments, the auxiliary locking apparatus 350 can be a nut that can be secured to a threaded end of each connecting member 340 upon positioning the latching mechanism 300 into the second or locked position. In other embodiments, the auxiliary locking apparatus 350 can be a pin or other elongated body that can be inserted into a bore through each connecting member 350 that can be accessible when the actuators 156 are moved from the first or unlocked position to the second or locked position. In still other embodiments, the auxiliary locking apparatus 350 can be a latching mechanism that can be coupled to the second end 152 of the sleeve assembly that can be moved from an unlocked or unlatched position to a locked or latched position when the actuators 156 are moved from the first or unlocked position to the second or locked position. Once the auxiliary locking apparatus 350 has been installed the actuators 156 can be released as the auxiliary locking apparatus 350 can maintain the latching mechanism 300 in the second or locked position.

Figure 7:
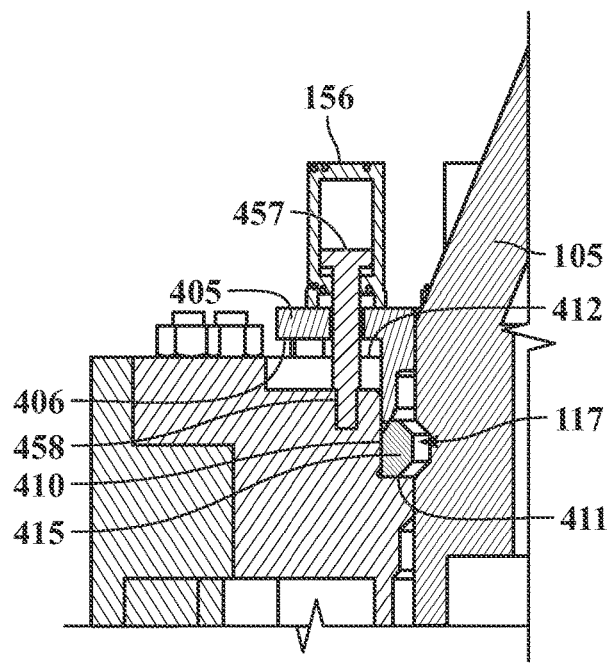
FIG. 7 depicts a partial elevation section view showing a first actuator ring and a first split ring of the latching mechanism shown in FIGS. 3-5 in a first or an unlocked position, according to one or more embodiments described.
Figure 8:
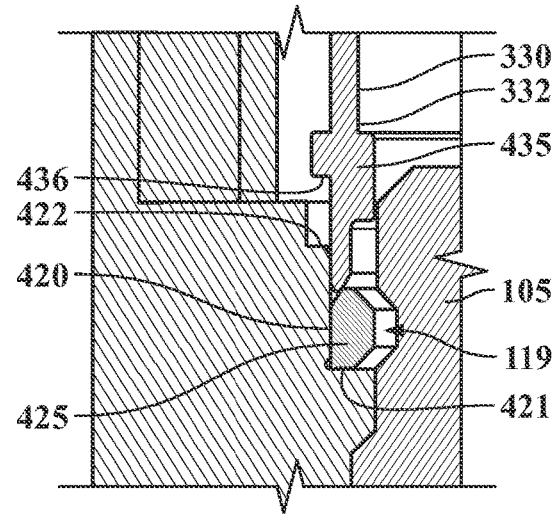
FIG. 8 depicts a partial elevation section view showing a second actuator ring and a second split ring of the latching mechanism shown in FIGS. 3-5 in a first or an unlocked position, according to one or more embodiments described.

FIG. 7 depicts a partial elevation section view showing the first actuator ring 405 and the first split ring 415 of the latching mechanism 300 shown in FIGS. 3-5 in a first or an unlocked position, according to one or more embodiments. The first split ring 415 can be outside of the first groove 117 defined by the outer surface 115 of the stinger 105 when the latching mechanism is in the first or unlocked position. FIG. 8 depicts a partial elevation section view showing the second actuator ring 435 disposed on the second end 432 of the moveably inner wall 330 and the second split ring 425 of the latching mechanism 300 shown in FIGS. 3-5 in a first or an unlocked position, according to one or more embodiments. The second split ring 425 can be outside of the second groove 119 defined by the outer surface 115 of the stinger 105 when the latching mechanism 300 is in the first or unlocked position.

Figure 9:
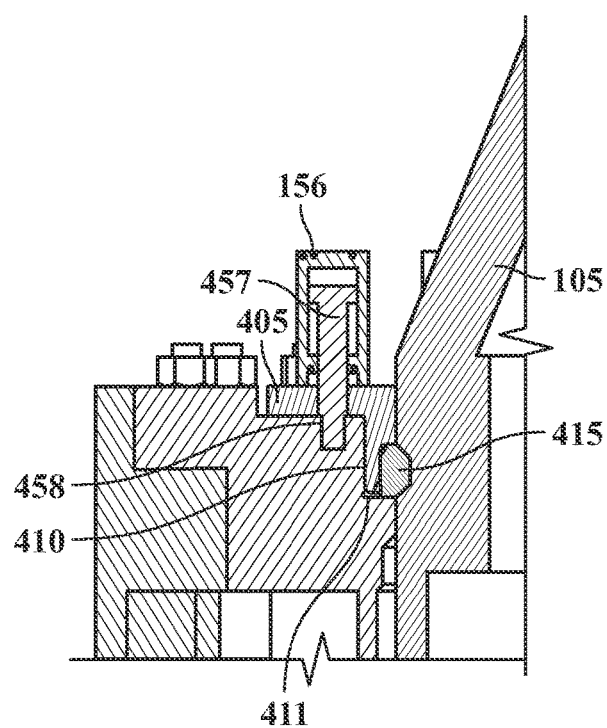
FIG. 9 depicts a partial elevation section view showing the first actuator ring and the first split ring of the latching mechanism shown in FIG. 7 in a second or a locked position, according to one or more embodiments described.

FIG. 9 depicts a partial elevation section view showing the first actuator ring 405 and the first split ring 415 of the latching mechanism 300 shown in FIG. 7 in a second or a locked position, according to one or more embodiments. When the latching mechanism 300 is in the second or locked position, the first actuator ring 405 can maintain the first split ring 415 in a position partially within the first groove 117 and partially on the first shoulder 411 to thereby secure the stinger 105 within the sleeve assembly 150. As shown in FIGS. 7 and 9, the piston 457 of the actuator 156 can be moved within the actuator 156 to move the first actuator ring 405 toward the first split ring 415 thereby forcing the first split ring 415 partially into the roove 117. In the particular embodiment shown, a first end 458 of the piston 457 can be secured, e.g., a threaded connection, to an end of the stationary inner wall 410 and by moving the piston 457 further into the actuator 156 the actuator 156 can move the first actuator ring 405 from the first or unlocked position to the second or locked position.

Figure 10:
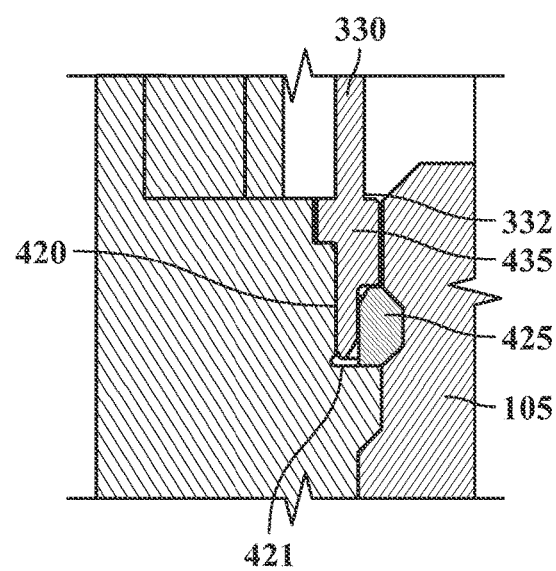
FIG. 10 depicts a partial elevation section view showing the second actuator ring and the second split ring of the latching mechanism shown in FIG. 8 in a second or a locked position, according to one or more embodiments described.

FIG. 10 depicts a partial elevation section view showing the second actuator ring 435 and the second split ring 425 of the latching mechanism 300 shown in FIG. 8 in a second or a locked position, according to one or more embodiments. When the latching mechanism 300 is in the second or locked position, the second actuator ring 435 can maintain the second split ring 425 in a position partially withing the second groove 119 and partially on the second shoulder 421 to thereby secure the stinger 105 within the sleeve assembly 150. As discussed above, the first and second actuator rings 405, 435 can be rigidly coupled together by at least one connecting member 340 such that the first and second actuator rings 405, 435 can be simultaneously moved when the latching mechanism 300 is moved between the first or unlocked position and the second or locked position.

In some embodiments, the ends of the first and second actuator rings 405, 425 can have an angled side/end on the side oriented toward the first and second split rings 415, 425, respectively. The opposing side in contact with the stationary walls 410, 420 can be substantially flat. In some embodiments, a surface 406 of the first actuator ring 405 and a surface 436 of the second actuator ring 435 can be configured to provide a stop when moved into the second or locked position by contacting a corresponding stop surface 412 and 422, respectively.

In some embodiments, a width $W_1$ (see FIG. 2) of the first groove 117 and a width $W_2$ (see FIG. 2) of the second groove 119 can be the same or different. In some embodiments, the width $W_1$ of the first groove 117 can be less than the width $W_2$ of the second groove 119. In other embodiments, the width $W_1$ of the first groove 117 can be greater than the width $W_2$ of the second groove 119. As such, it should be understood that the width of the first and second split rings 415, 425 can also be the same or different with respect to one another.

In some embodiments, the first and second split rings 415, 425 can be multi-sided split rings. As shown in FIGS. 7-10, the first and second split rings 415, 425 can include five relatively flat sides having the same or different lengths with respect to one another. In other embodiments, the split rings can have any desired cross-sectional shape such as rectangular (sets of opposing sides having the same or different lengths with respect to each set of sides), trapezoidal, e.g., with at least one set of opposing parallel sides, pentagonal, polygonal, e.g., with multiple sides with equal or unequal length, or the like. It should also be understood that the first and second grooves 117, 119 can be defined by inner walls that correspond to a cross-sectional shape of the first and second split rings 415, 425 such that the first and second grooves 117, 119 can receive the first and second split rings 415, 425 therein.

Figure 11:
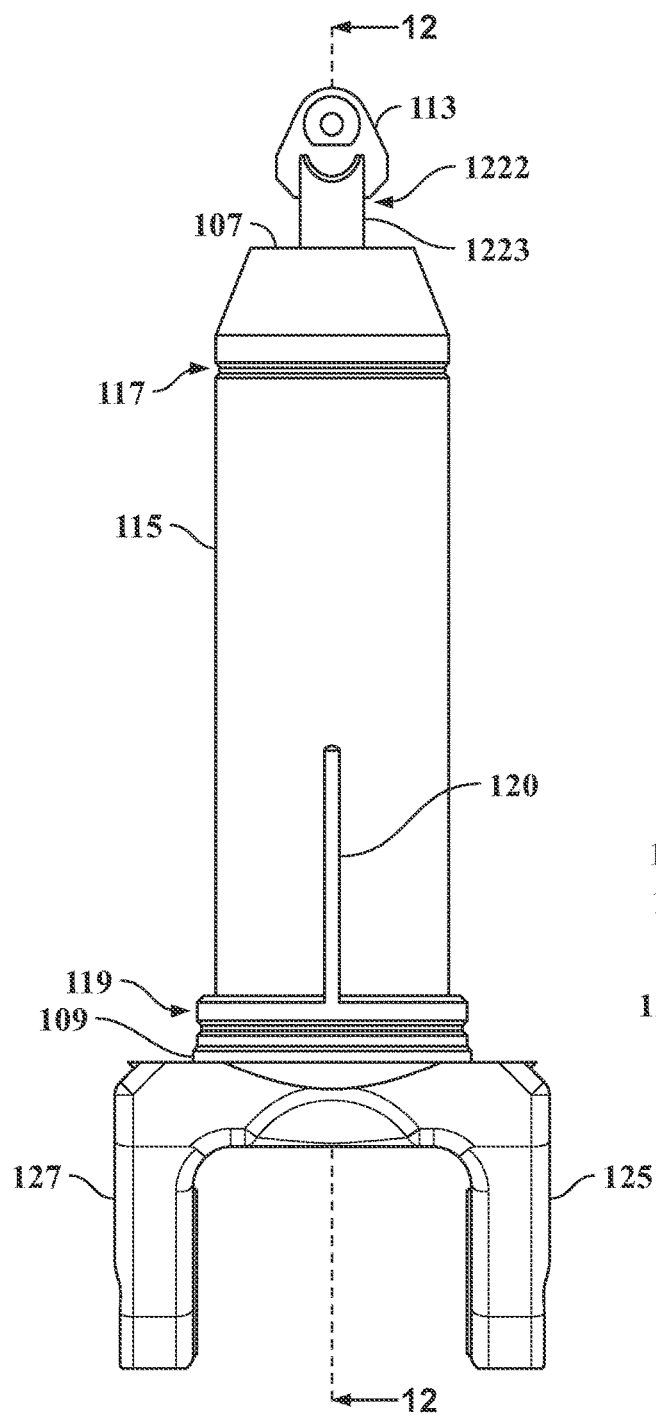
FIG. 11 depicts a side elevation view of an illustrative stinger in an unloaded position, according to one or more embodiments described.
Figure 12:
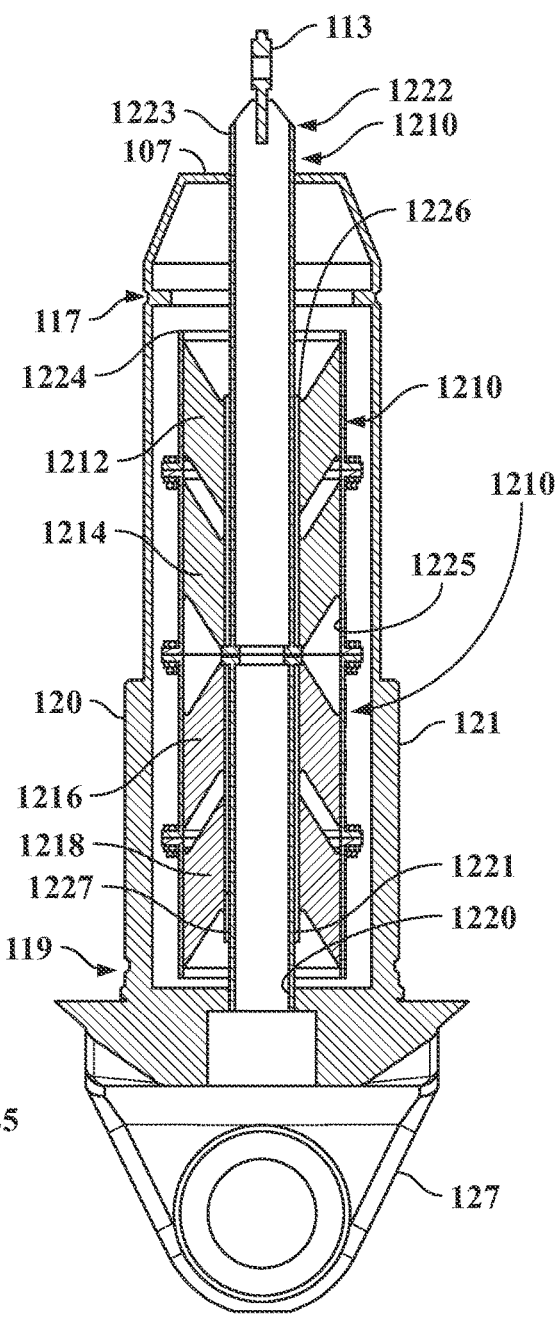
FIG. 12 depicts a cross-sectional elevation view of the stinger shown in FIG. 11 along line 12-12 that shows a shock absorber arrangement at least partially disposed therein in the unloaded position, according to one or more embodiments described.

FIG. 11 depicts a side elevation view of an illustrative stinger 1105 in an unloaded position and FIG. 12 depicts a cross-sectional elevation view of the stinger 1105 shown in FIG. 11 along line 12-12 that shows a shock absorber arrangement 1210 at least partially disposed therein in the unloaded position, according to one or more embodiments. The stinger 1105 can be similar to the stinger 105 described above with reference to FIGS. 1-5 and 7-10. The main difference is that the stinger 1105 can include a shock absorber arrangement 1210 at least partially disposed therein that can be configured to reduce dynamic loading during connection and disconnection of the stinger 1105 to the sleeve assembly 150 (see FIG. 1, for example). In some embodiments, the connector assembly 100 described above with reference to FIGS. 1-10 can include the stinger 1105 instead of the stinger 105.

In some embodiments, the shock absorber arrangement 1210 can be or can include one or more rubber or elastomeric shock absorber elements (four are shown, 1212, 1214, 1216, and 1218) that can be configured to deform when the stinger 1105 is in a loaded state. In some embodiments, the shock absorber arrangement can be or can include a gas spring with hydraulic damping (not shown). As also shown in FIGS. 11 and 12, the alignment keys 120, 121 can be positioned closer to the second groove 119 than the first groove 117 as compared to the stinger 105. As also shown, the stinger 1105 includes the optional connector structure 113, e.g., a padeye, a clevis, a trunnion, or the like, disposed on an end of a moveable member 1222 extending out from the first end 107 of the stinger 1105.

In addition to the shock absorber elements 1212, 1214, 1216, 1218, the shock absorber arrangement 1210 can also include a fixed member 1220, a moveable member 1222, and a moveable housing 1224. In some embodiments, the shock absorber elements 1212 and 1214 can be coupled to an outer surface 1223 of the moveable member 1222 and an inner surface 1225 of the moveable housing 1224 and the shock absorber elements 1216 and 1218 can be coupled to an outer surface 1221 of the fixed member 1220 and the inner surface 1225 of the moveable housing 1224. In other embodiments, the shock absorber elements 1212 and 1214 can be coupled to an intermediate member 1226 of the moveable member 1222 that can be disposed about and secured to the outer surface of the moveable member 1222 and an inner surface 1225 of the moveable housing 1224 and the shock absorber elements 1216 and 1218 can be coupled to an intermediate member 1227 of the fixed member 1220 that can be disposed about and secured to the outer surface 1221 of the fixed member 1220 and the inner surface 1225 of the moveable housing 1224.

The shock absorber elements 1212, 1214, 1216, and 1218 can be made from rubber or any other suitable elastomer. In some embodiments the shock absorber elements can be made from vulcanized rubber or other thermoplastic elastomer. In some embodiments, the shock absorber elements can have a minimum tensile strength of 18 MPa, as measured according to ASTM D412-16(2021). In some embodiments, the shock absorber elements can have a minimum elongation at break of 450%, as measured according to ASTM D412-16(2021). In some embodiments, the shock absorber elements can have a minimum tear resistance of 80 kN/m, as measured according to ASTM D624-00(2020), Method B. In some embodiments, the shock absorber elements can have a maximum compression set of 25%, as measured according to ASTM D395-18, Method B. In some embodiments, the shock absorber elements can exhibit no cracking under dynamic ozone testing conditions, as measured according to ASTM D1149-18.

The shock absorber elements 1212/1214 and 1216/1218 can be secured to the moveable member 1222 and the fixed member 1220, respectively, and the moveable housing 1224 via any suitable manner. In some embodiments, a bond having a sufficient strength can be formed between the shock absorber elements and the moveable housing 1224 and the moveable member 1222 or the fixed member 1220 during the manufacture of the shock absorber arrangement 1210. In some embodiments, an adhesive can be used to secure the shock absorber elements 1212, 1214, 1216, and 1218. In other embodiments one or more mechanical fasteners, e.g., screws, bolts, bolts and nuts, rivets, rods, or the like, can be used to secure the shock absorber elements 1212, 1214, 1216, and 1218.

Figure 13:
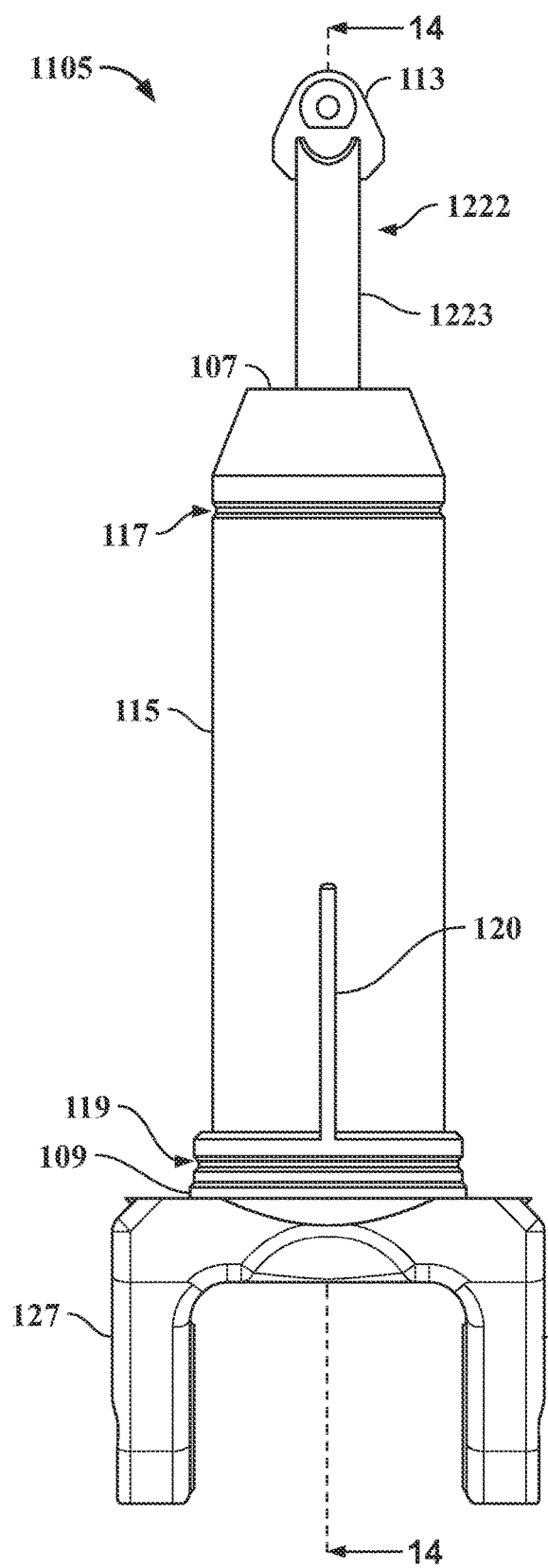
FIG. 13 depicts a side elevation view of the illustrative stinger shown in FIG. 11 in a loaded position, according to one or more embodiments described.
Figure 14:
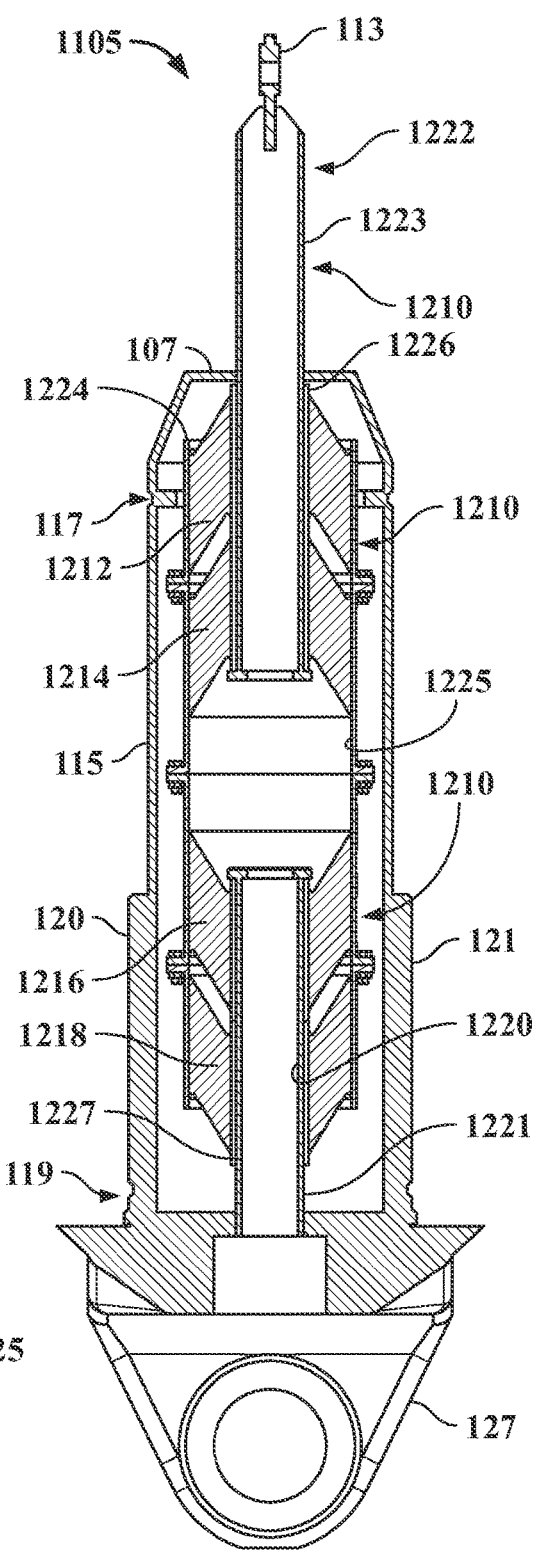
FIG. 14 depicts a cross-sectional elevation view of the stinger shown in FIG. 13 along line 14-14 that shows the shock absorber arrangement at least partially disposed therein in the loaded position, according to one or more embodiments described.

As shown in FIGS. 11 and 12, the shock absorber elements 1212, 1214, 1216, and 1218 are in an unloaded position. As a tension or load is applied to the connector structure 113 (or end of the moveable member 1222) the shock absorber elements 1212, 1214, 1216, and 1218 can deform to move the shock absorber elements 1212, 1214, 1216, and 1218 into a loaded position or state. FIG. 13 depicts a side elevation view of the stinger 1105 in a loaded position and FIG. 14 depicts a cross-sectional elevation view of the stinger 1105 shown in FIG. 13 along line 14-14 that shows the shock absorber arrangement 1210 disposed at least partially therein in the loaded position, according to one or more embodiments. As shown in FIGS. 12 and 14, as the shock absorber elements 1212, 1214, 1216, and 1218 move from the unloaded position to the loaded position the moveable housing 1224 and the moveable member 1222 move toward the first end 107 of the stinger 1105. The moveable member 1222 can further extend from the first end 107 of the stinger 1105 in the loaded position as compared to the unloaded position. As shown, an end of the intermediate member 1226 can contact the first end 107 of the stinger 1105 such that the moveable member 1222 can be prevented from moving any further toward the first end 107 of the stinger 1105. In other embodiments, if the shock absorber element 1212 is coupled directly to the outer surface 1223 of the moveable member 1222, a stop can be formed on the outer surface 1223 between the first end 107 of the stinger 1105 and the shock absorber element 1212 that can prevent the moveable member 1222 from extending too far out of the stinger 1105.

In some embodiments, the connector assembly 100 that can include the stinger 105 or the stinger 1105 can be used to connect a disconnectable yoke mooring system to a vessel. In some embodiments, a link or extension arm, for example, can be connected to the stinger 105/1105 via the connector structure 123. In some embodiments, the link or extension arm can be connected to a ballast tank or a yoke of a yoke mooring system. In such embodiment, one or more sleeve assemblies 150, which can correspond to the number of link or extension arms of a given yoke mooring system, can be disposed on a floating vessel and when the stinger 105/1105 of each corresponding link or extension arm is secured within the sleeve assembly 150, the link or extension arm can be suspended from the vessel and can support the yoke mooring structure coupled thereto. As such, the connector assembly 100 that can include the stinger 105 or the stinger 1105 can serve as a connector between a yoke mooring system and a floating vessel. In some embodiments, the yoke mooring system can be a disconnectable submerged yoke mooring system as described in U.S. patent application Ser. No. 17/962,087, filed on Oct. 7, 2022. In other embodiments, the yoke mooring system can be a disconnectable yoke mooring system that can be configured to remain above a surface of a body of water when the vessel is moored to a mooring structure at sea such as the yoke mooring systems described in U.S. Pat. No. 9,650,110 and U.S. Patent Application Publication Nos. 2020/0317297 and 2020/0317300.

In some embodiments, the connector assembly 100 can be used to connect a disconnectable yoke mooring system to a tower or other mooring support structure. In some embodiments, a turntable disposed on a tower or other mooring support structure can be connected to the second end of the stinger 105/1105 via the connector structure 123. In such embodiment, a sleeve assembly 150 can be connected to an end of a yoke in a yoke mooring system and can be configured to connect the end of the yoke of the yoke mooring system to the stinger 105/1105 disposed on the tower mooring support structure. In other embodiments, a turntable disposed on a tower or other mooring support structure can be connected to the sleeve assembly 150 and the stinger 105/1105 can be connected to an end of a yoke in a yoke mooring system via the connector structure 123 and the stinger 105/1105 can be connected to the turntable via the sleeve assembly 150. In some embodiments, the yoke mooring system can be a disconnectable yoke mooring system that can be configured to remain above a surface of a body of water when the vessel is moored to a mooring structure at sea such as the yoke mooring systems described in U.S. Pat. No. 9,650,110 and U.S. Patent Application Publication Nos. 2020/0317297 and 2020/0317300.

The connector assembly 100 can also be disconnected relatively quickly to allow a vessel moored to the yoke mooring system to depart therefrom, e.g., to avoid oncoming severe weather such as a hurricane or typhoon. Once the severe weather passes the vessel can return and be reconnected to the yoke mooring system or if the yoke mooring system remained with the vessel the yoke mooring system can be reconnected to the mooring structure.

The present disclosure further relates to any one or more of the following numbered embodiments:

1. A connector assembly, comprising: a stinger comprising a first end and a second end, wherein an outer surface of the stinger defines a first groove located toward the first end thereof and a second groove located toward the second end thereof; and a sleeve assembly comprising a first end, a second end, and a latching mechanism, the sleeve assembly being configured to receive the stinger and secure the stinger therein via the latching mechanism, wherein: an inner surface of the sleeve assembly defines a first shoulder located toward the first end thereof and a second shoulder located toward the second end thereof, the latching mechanism is selectively moveable between an unlocked position and a locked position, when the latching mechanism is in the unlocked position the stinger can be inserted into or removed from the sleeve assembly; and when the stinger is fully positioned within the sleeve assembly and the latching mechanism is in the locked position the latching mechanism is configured to maintain a first split ring in a position partially within the first groove and partially on the first shoulder and a second split ring in a position partially within the second groove and partially on the second shoulder to secure the stinger within the sleeve assembly.

2. The connector assembly of paragraph 1, wherein the stinger further comprises an alignment key disposed on the outer surface of the stinger and the sleeve assembly further comprises an inner guide comprising at least one guide surface configured to engage the alignment key during insertion of the stinger to rotatively align the stinger within the sleeve assembly.

3. The connector assembly of paragraph 1 or paragraph 2, wherein the latching mechanism is configured to move between the locked position and the unlocked position by operating one or more hydraulic actuators, one or more one pneumatic actuators, one or more electric actuators, or a combination thereof.

4. The connector assembly of any one of paragraphs 1 to 3, wherein the latching mechanism comprises a first actuator ring disposed toward the first end of the sleeve assembly and a second actuator ring disposed toward the second end of the sleeve assembly.

5. The connector assembly of paragraph 4, wherein, when the stinger is fully positioned within the sleeve assembly and the latching mechanism is in the locked position, the first actuator ring is configured to maintain the first split ring in the position partially within the first groove and partially on the first shoulder and the second actuator ring is configured to maintain the second split ring in the position partially within the second groove and partially on the second shoulder.

6. The connector assembly of paragraph 4 or paragraph 5, wherein the first and second actuator rings are rigidly coupled together by at least one connecting member such that the first and second actuator rings move simultaneously when the latching mechanism is moved between the unlocked position and the locked position.

7. The connector assembly of any one of paragraphs 1 to 6, wherein the sleeve assembly further comprises an auxiliary locking apparatus configured to secure the first actuator ring and the second actuator ring in the locked position.

8. The connector assembly of paragraph 7, wherein the auxiliary locking apparatus comprises a mechanical fastener, a mechanical latch, or a combination thereof.

9. The connector assembly of any one of paragraphs 1 to 8, wherein the stinger comprises a padeye, a clevis, or a trunnion disposed on the first end of the stinger.

10. The connector assembly of any one of paragraphs 1 to 9, wherein the first end of the stinger has a frustoconical surface.

11. The connector assembly of any one of paragraphs 1 to 10, wherein, when the stinger is fully positioned within the sleeve assembly and the latching mechanism is in the locked position, the second split ring is configured to support a greater axial load than the first split ring.

12. The connector assembly of any one of paragraphs 1 toll, wherein, when the stinger is fully positioned within the sleeve assembly and the latching mechanism is in the locked position, the first split ring is configured to support a greater radial load than the second split ring.

13. The connector assembly of any one of paragraphs 1 to 12, wherein, when the stinger is fully positioned within the sleeve assembly and the latching mechanism is in the locked position, the second split ring is configured to support a greater total load than the first split ring.

14. The connector assembly of any one of paragraphs 1 to 13, wherein an outer diameter of the second split ring is greater than an outer diameter of the first split ring.

15. The connector assembly of any one of paragraphs 1 to 14, further comprising a clevis disposed on the second end of the stinger.

16. The connector assembly of any one of paragraphs 1 to 15, wherein the stinger comprises a solid body.

17. The connector assembly of any one of paragraphs 1 to 15, wherein the stinger further comprises a shock absorber arrangement disposed therein, and wherein the shock absorber arrangement is configured to reduce dynamic loading during connection of the stinger to the sleeve assembly.

18. The connector assembly of any one of paragraphs 1 to 17, wherein the stinger does not include any bore, channel, or other flow path that extends from the first end to the second end thereof.

19. A connector assembly, comprising: a stinger comprising a first end and a second end, wherein an outer surface of the stinger defines a first groove located toward the first end thereof and a second groove located toward the second end thereof; and a sleeve assembly configured to receive and secure the stinger therein, wherein: the sleeve assembly comprises a first end, a second end, a first stationary inner wall disposed toward the first end thereof, a second stationary inner wall disposed toward the second end thereof, and a moveable inner wall disposed between the first and second stationary inner walls that is configured to move with respect to the first and second stationary inner walls, wherein: the first stationary inner wall defines a first shoulder, the second stationary inner wall defines a second shoulder, a first split ring is disposed on the first shoulder, a second split ring is disposed on the second shoulder, a first actuator ring is disposed above the first split ring that is configured to force the first split ring partially into the first groove and partially on the first shoulder when the first actuator ring is moved from a first position to a second position, and a second actuator ring is disposed on an end of the moveable inner wall that is proximate the second stationary inner wall, the second actuator ring configured to force the second split ring partially into the second groove and partially on the second shoulder when the moveable inner wall is moved from a first position to a second position.

20. The connector assembly of paragraph 19, wherein the first actuator ring and the second actuator ring are configured to move between the first positions and the second positions simultaneously.

21. The connector assembly of paragraph 19 or paragraph 20, wherein the first actuator ring and the second actuator ring are configured to move between the first positions and the second positions simultaneously via actuation of one or more actuators.

22. The connector assembly of paragraph 21, wherein the one or more actuators comprise one or more hydraulic actuators, one or more pneumatic actuators, one or more electric actuators, or a combination thereof.

23. The connector assembly of any one of paragraphs 19 to 22, wherein the first actuator ring and the moveable inner wall are coupled together by at least one connecting member.

24. The connector assembly of any one of paragraphs 19 to 23, wherein the stinger further comprises at least one alignment key disposed on the outer surface thereof, and wherein the sleeve assembly further comprises an inner guide comprising at least one guide surface configured to engage the at least one alignment key during insertion of the stinger to rotatively align the stinger within the sleeve assembly.

25. The connector assembly of paragraph 24, wherein the moveable inner surface of the sleeve assembly is movable with respect to the inner guide.

26. The connector assembly of any one of paragraphs 19 to 25, further comprising an auxiliary locking mechanism disposed on the sleeve assembly that is configured to secure the first actuator ring and the second actuator ring in the second position.

27. The connector assembly of paragraph 26, wherein the auxiliary locking apparatus comprises a mechanical fastener, mechanical latch, or a combination thereof.

28. The connector assembly of any one of paragraphs 19 to 27, wherein the stinger comprises a padeye, a clevis, or a trunnion disposed on the first end of the stinger.

29. The connector assembly of any one of paragraphs 19 to 28, wherein the first end of the elongated body has a frustoconical surface.

30. The connector assembly of any one of paragraphs 19 to 29, wherein, when the stinger is fully positioned within the sleeve assembly and the first actuator ring and the second actuator ring are in the second position, the second split ring is configured to support a greater axial load than the first split ring.

31. The connector assembly of any one of paragraphs 19 to 30, wherein, when the stinger is fully positioned within the sleeve assembly and the first actuator ring and the second actuator ring are in the second position, the first split ring is configured to support a greater radial load than the second split ring.

32. The connector assembly of any one of paragraphs 19 to 31, wherein, when the stinger is fully positioned within the sleeve assembly and the first actuator ring and the second actuator ring are in the second position, the second split ring is configured to support a greater total load than the first split ring.

33. The connector assembly of any one of paragraphs 19 to 32, wherein an outer diameter of the second split ring is greater than an outer diameter of the first split ring.

34. The connector assembly of any one of paragraphs 19 to 33, further comprising a clevis disposed on the second end of the stinger.

35. The connector assembly of any one of paragraphs 19 to 34, wherein the stinger comprises a solid body.

36. The connector assembly of any one of paragraphs 19 to 34, wherein the stinger further comprises a shock absorber arrangement disposed therein, and wherein the shock absorber arrangement is configured to reduce dynamic loading during connection of the stinger to the sleeve assembly.

37. The connector assembly of any one of paragraphs 19 to 36, wherein the stinger does not include any bore, channel, or other flow path that extends from the first end to the second end thereof.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, patent applications, test procedures, and other documents cited in this application are fully incorporated by reference to the extent such disclosure is not inconsistent with this application and for all jurisdictions in which such incorporation is permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A connector assembly, comprising:
a stinger comprising a first end and a second end, wherein an outer surface of the stinger defines a first groove located toward the first end thereof and a second groove located toward the second end thereof; and
a sleeve assembly comprising a first end, a second end, and a latching mechanism, the sleeve assembly being configured to receive the stinger and secure the stinger therein via the latching mechanism, wherein:
an inner surface of the sleeve assembly defines a first shoulder located toward the first end thereof and a second shoulder located toward the second end thereof,
the latching mechanism is selectively moveable between an unlocked position and a locked position,
when the latching mechanism is in the unlocked position the stinger can be inserted into or removed from the sleeve assembly; and
when the stinger is fully positioned within the sleeve assembly and the latching mechanism is in the locked position the latching mechanism is configured to maintain a first split ring in a position partially within the first groove and partially on the first shoulder and a second split ring in a position partially within the second groove and partially on the second shoulder to secure the stinger within the sleeve assembly.

2. The connector assembly of claim 1, wherein the stinger further comprises an alignment key disposed on the outer surface of the stinger and the sleeve assembly further comprises an inner guide comprising at least one guide surface configured to engage the alignment key during insertion of the stinger to rotatively align the stinger within the sleeve assembly.

3. The connector assembly of claim 1, wherein the latching mechanism is configured to move between the locked position and the unlocked position by operating one or more hydraulic actuators, one or more one pneumatic actuators, one or more electric actuators, or a combination thereof.

4. The connector assembly of claim 1, wherein the latching mechanism comprises a first actuator ring disposed toward the first end of the sleeve assembly and a second actuator ring disposed toward the second end of the sleeve assembly, wherein, when the stinger is fully positioned within the sleeve assembly and the latching mechanism is in the locked position, the first actuator ring is configured to maintain the first split ring in the position partially within the first groove and partially on the first shoulder and the second actuator ring is configured to maintain the second split ring in the position partially within the second groove and partially on the second shoulder, and wherein the first and second actuator rings are rigidly coupled together by at least one connecting member such that the first and second actuator rings move simultaneously when the latching mechanism is moved between the unlocked position and the locked position.

5. The connector assembly of claim 1, wherein the sleeve assembly further comprises an auxiliary locking apparatus configured to secure the first actuator ring and the second actuator ring in the locked position.

6. The connector assembly of claim 5, wherein the auxiliary locking apparatus comprises a mechanical fastener, a mechanical latch, or a combination thereof.

7. The connector assembly of claim 1, wherein the stinger comprises a padeye, a clevis, or a trunnion disposed on the first end of the stinger.

8. The connector assembly of claim 1, wherein the first end of the stinger has a frustoconical surface.

9. The connector assembly of claim 1, wherein, when the stinger is fully positioned within the sleeve assembly and the latching mechanism is in the locked position, the second split ring is configured to support a greater axial load than the first split ring, the first split ring is configured to support a greater radial load than the second split ring, and the second split ring is configured to support a greater total load than the first split ring.

10. The connector assembly of claim 1, wherein an outer diameter of the second split ring is greater than an outer diameter of the first split ring.

11. The connector assembly of claim 1, wherein the stinger further comprises a shock absorber arrangement disposed therein, and wherein the shock absorber arrangement is configured to reduce dynamic loading during connection of the stinger to the sleeve assembly.

12. A connector assembly, comprising:
a stinger comprising a first end and a second end, wherein an outer surface of the stinger defines a first groove located toward the first end thereof and a second groove located toward the second end thereof; and
a sleeve assembly configured to receive and secure the stinger therein, wherein:
the sleeve assembly comprises a first end, a second end, a first stationary inner wall disposed toward the first end thereof, a second stationary inner wall disposed toward the second end thereof, and a moveable inner wall disposed between the first and second stationary inner walls that is configured to move with respect to the first and second stationary inner walls, wherein:
the first stationary inner wall defines a first shoulder,
the second stationary inner wall defines a second shoulder,
a first split ring is disposed on the first shoulder,
a second split ring is disposed on the second shoulder,
a first actuator ring is disposed above the first split ring that is configured to force the first split ring partially into the first groove and partially on the first shoulder when the first actuator ring is moved from a first position to a second position, and
a second actuator ring is disposed on an end of the moveable inner wall that is proximate the second stationary inner wall, the second actuator ring configured to force the second split ring partially into the second groove and partially on the second shoulder when the moveable inner wall is moved from a first position to a second position.

13. The connector assembly of claim 12, wherein the first actuator ring and the second actuator ring are configured to move between the first positions and the second positions simultaneously.

14. The connector assembly of claim 12, wherein the first actuator ring and the second actuator ring are configured to move between the first positions and the second positions simultaneously via actuation of one or more actuators.

15. The connector assembly of claim 12, wherein the stinger further comprises at least one alignment key disposed on the outer surface thereof, and wherein the sleeve assembly further comprises an inner guide comprising at least one guide surface configured to engage the at least one alignment key during insertion of the stinger to rotatively align the stinger within the sleeve assembly.

16. The connector assembly of claim 12, further comprising an auxiliary locking mechanism disposed on the sleeve assembly that is configured to secure the first actuator ring and the second actuator ring in the second position.

17. The connector assembly of claim 12, wherein the stinger comprises a padeye, a clevis, or a trunnion disposed on the first end of the stinger.

18. The connector assembly of claim 12, wherein, when the stinger is fully positioned within the sleeve assembly and the first actuator ring and the second actuator ring are in the second position, the second split ring is configured to support a greater axial load than the first split ring, the first split ring is configured to support a greater radial load than the second split ring, and the second split ring is configured to support a greater total load than the first split ring.

19. The connector assembly of claim 12, wherein an outer diameter of the second split ring is greater than an outer diameter of the first split ring.

20. The connector assembly of claim 12, wherein the stinger further comprises a shock absorber arrangement disposed therein, and wherein the shock absorber arrangement is configured to reduce dynamic loading during connection of the stinger to the sleeve assembly.

* * * * *